B. F. EATON.

PAPER AND TWINE HOLDER.

No. 7,087. Reissued May 2, 1876.

Witnesses

Chas. H. Smith

Harold Serrell

Inventor

Benjamin F. Eaton per Lemuel W. Serrell

Att'y.

N. PETERS, PHOTO-LITHOGRAPHER, WASHINGTON, D. C.

UNITED STATES PATENT OFFICE.

BENJAMIN F. EATON, OF ALBANY, NEW YORK.

IMPROVEMENT IN PAPER AND TWINE HOLDERS.

Specification forming part of Letters Patent No. 158,203, dated December 29, 1874; reissue No. 7,087, dated May 2, 1876; application filed March 29, 1876.

*To all whom it may concern:*

Be it known that I, BENJAMIN F. EATON, of Albany, in the State of New York, have invented an Improvement in Paper-Holding Cases, of which the following is a specification:

I make use of a case in which a roll of paper is placed, and the paper passes out of one side of the case over a rest, and above this rest is a swinging blade that can be held upon the paper while it is being torn off, and there is a notch in the rest that facilitates the grasping of the edge of the sheet to draw the same off the roll. It is preferable to cover the surface of the rest with india-rubber or other yielding material, to compensate inequalities in the blade, and I mount the paper-holding case removably in a frame, so that two or more paper-cases, with rolls of paper of different widths or qualities, may be inserted in the holder, and I use a twine holder and cutter upon the frame. Thereby the holder is complete in itself, with all the appliances required in putting up packages or parcels.

Figure 2:
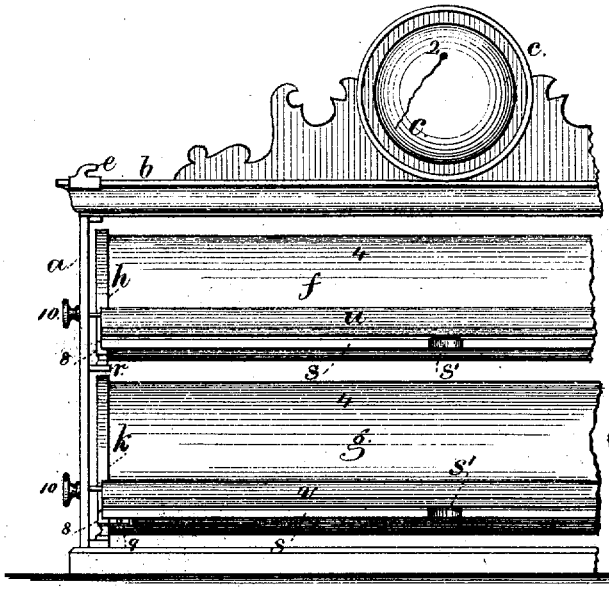
Figure 3:
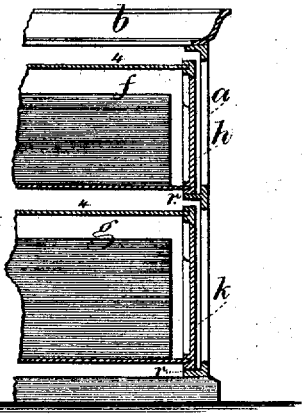
Figure 4:
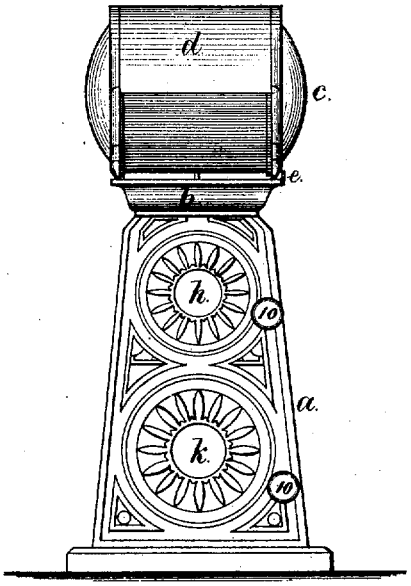
Figure 1:
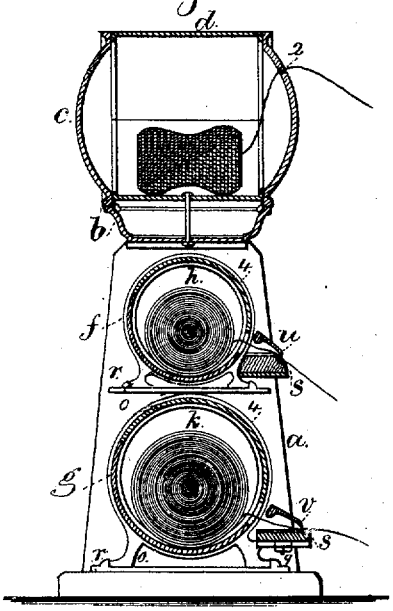

In the drawing, Figure 1 is a vertical transverse section. Fig. 2 is an elevation at one end of the frame and rolls, and Fig. 3 is a section at the other end. Fig. 4 is an elevation of the end of the holder.

The frames *a a* are of ornamental shape, and provided with a connecting top frame, *b*, upon which is the twine-holder *c*, that is provided with a movable cover, *d*, and an opening, 2, at one side, for the string to be passed out. The twine-cutter *e* is attached to the holder *c* or frame *b*. The cylindrical cases *f* and *g* are made with heads or ends *h* and *k*, and movable sections at 4, forming the top portions of the cylinders that can be taken off for inserting the rolls of paper *m n*.

I remark that in one of the cylinders the roll may be the entire length of the case, and in the other case two rolls may be inserted, of about two-thirds and one-third, respectively, of the length of the case, so as to provide three widths of paper; and this paper-holder is adapted to any widths of paper, and to one or more rolls in one case. These cylindrical cases are each made with a mouth at one side, for the paper to pass out, and there are end legs or rests *o*, that sit upon flanges or supports *r* at the inner surfaces of the frames *a*, so that the cases may be lifted bodily out from the frames for inserting the roll of paper.

There are lugs at the ends of the flanges *r* to keep the cases in place when they are inserted into their positions. Contiguous to the mouth there is a rest, *s*, for the paper. This may be of wood or metal, and, by preference, it has an upper surface made of a strip of india-rubber or yielding material cemented into place; and it is preferable to sustain this rest at the ends by the arms 8, projecting from the ends of the cases or sides of the frame, to which arms the said rests are clamped or fastened, as at 9 9, and there is a notch or opening at *s'* in the rest, to facilitate the grasping of the edge of the paper to draw it along.

The tearing straight edges or knives *u v* are sustained at their ends, and a screw, 10, with a head, is shown as forming the means for moving such knife to press its edges upon the paper while it is being torn off against such edge; and I remark that, by unscrewing these screws 10, the knives may be taken out for sharpening.

I claim as my invention—

1. A case for holding a roll of paper, provided with an opening through which the paper is drawn, in combination with a rest and a swinging knife against which the paper is torn, substantially as set forth.

2. The rest *s*, for the paper, having a notch at *s'*, in combination with the tearing-knife and holder for a roll of paper, substantially as set forth.

3. The rest *s*, for the paper, projecting from one side of the paper-holder, and having a notch, *s'*, to facilitate the grasping of the paper, in combination with the tearing-knife *v* and its button-head 10, substantially as set forth.

4. The removable case for holding a roll of wrapping-paper, combined with a frame having ledges or flanges upon which such case rests, and a turning-knife supported by such frame, and against which the paper is torn, substantially as set forth.

5. The rest *s*, for the paper, covered with a strip of rubber or yielding material, and the swinging knife, arranged in relation to the removable paper-holding case, substantially as set forth.

Signed by me this 9th day of March, A. D. 1876.

BENJAMIN F. EATON.

Witnesses:
SIDNEY A. DWIGHT,
A. C. DWIGHT.